Patented May 7, 1940

2,199,837

UNITED STATES PATENT OFFICE 2,199,837

CATALYST REGENERATION

Eger V. Murphree, Summit, N. J., assignor to Standard Oil Development Company, a corporation of Delaware No Drawing. Application March 18, 1938, Serial No. 196,623

4 Claims. (Cl. 23—238)

This invention relates to the regeneration of solid catalytic or other contact materials fouled with carbonaceous deposits and pertains more particularly to a method of maintaining a low temperature during regeneration.

In many processes involving the treatment of organic compounds with solid catalysts or other contact masses a carbonaceous deposit more or less gradually accumulates on the surface which interferes with the proper functioning of the contact mass. In such processes it becomes necessary to periodically discontinue the operation to remove such deposits. The common method employed for this purpose is to burn such deposits by passing a stream of air heated to ignition temperature over the material to be regenerated. This burning or regenerating operation results in the evolution of considerable heat which tends to rapidly increase the regenerating temperature. In many cases the efficiency of the material for carrying out the desired reaction is impaired if the temperature attained during regeneration becomes excessive. This is particularly true in cases where the contact material has porous adsorptive properties such as certain active or activated clays or activated alumina or where the mass becomes unstable at high temperatures such as for example when the mass contains decomposable salts.

One of the common methods for regulating the regenerating temperature is to dilute the air, or other oxidizing gas with an inert gas such as steam or spent combustion gases to reduce the rate of combustion and increase the capacity of the gases to remove the heat of reaction. However, there are definite limitations on the minimum temperature which can be maintained in this manner.

In order to initiate the reaction the regenerating gas must be brought to the ignition temperature of the carbonaceous deposits. This temperature, however, varies with the partial pressure of the oxygen present in the gas. Consequently, as the air becomes increasingly diluted the ignition temperature gradually increases. As a result, any advantage gained by dilution of the gases tends to become offset by increase in ignition temperature required to initiate the combustion. In view of these factors, to maintain relatively low temperatures, such as temperatures below 1000° F. in this manner, it is necessary to circulate large quantities of gas in order to remove heat and hence the regeneration is difficult.

One of the principal objects of the present invention is to provide a method of controlling regeneration which will permit maintenance of a lower temperature. A further object of the invention is to provide a method of regeneration which will permit rapid removal of heat of reaction without increasing the ignition temperature.

Other more specific objects and advantages will be apparent from the more detailed description hereinafter.

I have found that the regenerating temperature can be more effectively controlled within lower maximum limits, if, in addition to regulating the oxygen concentration by introduction of diluent gases, a substantial superatmospheric back pressure is imposed on the regenerating gases leaving the regenerating chamber. It has been discovered that by a proper combination of these factors, namely, oxygen concentration and back pressure the regenerating temperature can be readily maintained below 1000° F.

The amount of back pressure maintained on the gases may vary over a wide range such as from one atmosphere to twenty or more atmospheres depending upon the maximum permissible regenerating temperature and other factors. For example, in chemical processes requiring high pressure equipment, the back pressure during regeneration may be somewhat comparable to the reaction pressure to avoid a wide pressure differential during reaction and regeneration. If, on the other hand, the reaction pressure is relatively low, such as for example, in catalytic cracking, the back pressure may be relatively low. When regenerating solid contact material employed in low pressure chemical processes such as in catalytic cracking processes where it is desirable to maintain the temperature below 1000° F., back pressures of between two and four atmospheres are sufficient.

The oxygen concentration may likewise vary over a substantial range from a fraction of a percent to 10% or more depending upon the back pressure maintained, nature of catalysts and other factors. In practice, it is preferred to impose a substantially uniform back pressure and regulate the oxygen concentration to effect the desired temperature control. In general, the oxygen concentration during the initial stage of regeneration must be relatively lower than during the final stage. As the regeneration proceeds, the oxygen concentration may be gradually increased. In the final stage of regeneration, the rate of combustion is determined more by the rate of diffusion of the gases into the pores of the contact mass than by the concentration of the oxygen in the gas. The initial stage of regeneration is the critical period in controlling the regenerating temperature.

As a guide to carrying out the invention to obtain the greatest benefits therefrom, the following examples will be of assistance, it being understood that the conditions specified are illustrative rather than limitive.

It will be understood that the pressure herein disclosed refers to gage pressure and not absolute pressure.

Example 1

A catalyst consisting of pumice impregnated with a mixture of aluminum oxide and zinc tungstate powder which had become fouled with acetylene polymer products formed during the production of acetaldehyde from acetylene was regenerated by passing oxygen containing spent combustion gases through the catalyst mass while maintaining a back pressure of about 25 pounds per square inch gage. The oxygen concentration was regulated to maintain the maximum temperature below 500° C. (932° F.) and ranged from .3% during the initial stage of regeneration to about 9% during the final stage. The maximum measured temperature during regeneration was 882° F. (450° C.).

Example 2

A second regeneration was carried out in the same manner employing a back pressure of about 34 pounds per square inch. The oxygen concentration was varied from .5% at the beginning of the regeneration to about 8% at the conclusion. The maximum recorded temperature was 907° F. (486° C.).

Example 3

A bauxite catalyst employed for desulphurizing petroleum distillates which had become fouled with polymer products and other carbonaceous materials was regenerated by passing oxygen containing spent combustion gases through the catalyst while maintaining a back pressure of the order of 250 pounds per square inch. The oxygen concentration ranged from about 1.3% at the beginning to 6% at the conclusion of the regeneration.

Example 4

An activated clay catalyst fouled with carbonaceous deposits resulting from catalytic cracking was regenerated by passing oxygen containing gas through the catalyst mass under a back pressure of about 45 pounds per square inch gage. The oxygen concentration during the beginning of the regeneration was about 1% and was gradually raised until it amounted to 4% during the final period of regeneration. The temperature was maintained below 1000° F. throughout the regenerating period.

It will be understood that the term back pressure as here employed means the pressure on the gases leaving the regenerating chamber and should not be confused with the initial pressure imposed on the gases for the purpose of overcoming the pressure drop through the catalyst mass.

The inventor is aware that it has previously been proposed to impose a back pressure during the final stages of regeneration for the alleged purpose of facilitating diffusion of the gas into the pores, but in the present invention the pressure is imposed in the initial stages as well as during the final stages for the purpose of controlling temperature.

Having described the preferred embodiment of this invention and given specific examples thereof, it will be understood that it embraces such other modifications and variations as come within the spirit and scope thereof.

I claim:

1. A method of regenerating a contact mass fouled with carbonaceous deposits which comprises passing an oxygen-containing gas through said contact mass at an initial temperature sufficient to ignite said carbonaceous deposits under the conditions obtaining within the regeneration zone while maintaining during the entire period of regeneration a back pressure on the gases leaving the regeneration zone of at least one atmosphere gauge pressure and so regulating the oxygen concentration of the regeneration gas during the regeneration as to cause immediate active combustion at the beginning of the regeneration, which active combustion continues to the completion of the regeneration without causing the contact mass to acquire a temperature exceeding a desired maximum.

2. A method of removing carbonaceous deposits from a contact mass which comprises passing an oxygen containing regenerating gas at a temperature sufficiently high to initiate combustion through said contact mass, maintaining during the entire period of regeneration a back pressure of at least one atmosphere gauge pressure on the gases leaving said reaction chamber, and regulating the oxygen concentration of said regenerating gas to prevent the temperature from exceeding a predetermined maximum.

3. A method of removing carbonaceous deposits from a contact mass which comprises passing an oxygen containing regenerating gas at a temperature sufficiently high to initiate combustion through said contact mass, maintaining during the entire period of regeneration a back pressure on the gases leaving the regenerating chamber between the limits of about 1 to 20 atmospheres gauge pressure and regulating the oxygen concentration of the gases to prevent the temperature from exceeding the desired maximum.

4. A method of regenerating a contact mass fouled with carbonaceous deposits which comprises passing an oxygen containing regenerating gas through said contact mass at an initial temperature sufficient to ignite said carbonaceous deposits under the conditions obtaining within the regenerating zone, maintaining during the entire period of regeneration a back pressure on the gases leaving the regenerating zone of at least two atmospheres gauge pressure and regulating the oxygen concentration of the gases passing to said contact mass to prevent the temperature from exceeding a desired maximum.

EGER V. MURPHREE.